US012668658B2

(12) United States Patent
Choi et al.

(10) Patent No.: US 12,668,658 B2
(45) Date of Patent: Jun. 30, 2026

(54) BINDER COMPOSITION, EPOXY-BASED CURED PRODUCT FORMED THEREFROM, AND LIGHT EMITTING LAYER CONTAINING EPOXY-BASED CURED PRODUCT

(71) Applicants: Hyundai Motor Company, Seoul (KR); Kia Corporation, Seoul (KR); Korea Electronics Technology Institute, Seongnam-si (KR)

(72) Inventors: Tae Young Choi, Gwacheon-si (KR); Keum Hwan Park, Seongnam-si (KR); Young Min Kim, Seongnam-si (KR); Young Eun Kim, Hanam-si (KR); Ji Young Kim, Seoul (KR)

(73) Assignees: Hyundai Motor Company, Seoul (KR); Kia Corporation, Seoul (KR); Korea Electronics Technology Institute, Seongnam-si (KR)

( * ) Notice: Subject to any disclaimer, the term of this patent is extended or adjusted under 35 U.S.C. 154(b) by 457 days.

(21) Appl. No.: 18/503,651

(22) Filed: Nov. 7, 2023

(65) Prior Publication Data
US 2025/0019488 A1     Jan. 16, 2025

(30) Foreign Application Priority Data
Jul. 14, 2023     (KR) ........................ 10-2023-0091975

(51) Int. Cl.
| | |
|---|---|
| *C08G 59/22* | (2006.01) |
| *C08G 59/24* | (2006.01) |
| *C08G 59/66* | (2006.01) |
| *C08G 59/68* | (2006.01) |
| *C08J 5/18* | (2006.01) |
| *C08K 3/30* | (2006.01) |
| *C09K 11/02* | (2006.01) |
| *C09K 11/61* | (2006.01) |

(52) U.S. Cl.
CPC ......... *C08G 59/226* (2013.01); *C08G 59/245* (2013.01); *C08G 59/66* (2013.01); *C08G 59/686* (2013.01); *C08J 5/18* (2013.01); *C08K 3/30* (2013.01); *C09K 11/02* (2013.01); *C09K 11/612* (2013.01); *C08J 2363/02* (2013.01); *C08K 2003/3036* (2013.01)

(58) Field of Classification Search
CPC .... C08G 59/226; C08G 59/245; C08G 59/66; C08G 59/686; C08J 5/18; C08K 3/30; C08K 2003/3036; C08L 63/00; C08L 2205/025; C09K 11/02; C09K 11/612; H10K 50/11
See application file for complete search history.

(56) References Cited

U.S. PATENT DOCUMENTS

| | | | |
|---|---|---|---|
| 7,824,936 B2 | 11/2010 | Park et al. | |
| 2007/0255015 A1* | 11/2007 | Kato ........................ | C09D 5/03 524/904 |
| 2009/0023233 A1 | 1/2009 | Park et al. | |

FOREIGN PATENT DOCUMENTS

| | | | | |
|---|---|---|---|---|
| JP | 925393 | A | * | 1/1997 |
| JP | 6135846 | B2 | * | 5/2017 |
| KR | 100415326 | B1 | | 1/2004 |
| KR | 100664655 | B1 | | 1/2007 |
| KR | 20090008879 | A | | 1/2009 |
| WO | WO-2022126463 | A1 | * | 6/2022 |

* cited by examiner

*Primary Examiner* — Anthony J Green
(74) *Attorney, Agent, or Firm* — Slater Matsil, LLP

(57) ABSTRACT

In embodiment, a binder composition includes a multifunctional compound containing three or more functional groups, a first bifunctional epoxy resin, and a second bifunctional epoxy resin. The second bifunctional epoxy resin can have a weight average molecular weight greater than a weight average molecular weight of the first bifunctional epoxy resin, and a mass ratio of the first bifunctional epoxy resin and the second bifunctional epoxy resin is in a range from 0.45:1 to 7.0:1. In an embodiment, an epoxy-based cured product includes such binder composition. And in an embodiment, a light emitting layer includes such epoxy-based cured product.

20 Claims, 2 Drawing Sheets

BINDER COMPOSITION, EPOXY-BASED CURED PRODUCT FORMED THEREFROM, AND LIGHT EMITTING LAYER CONTAINING EPOXY-BASED CURED PRODUCT

CROSS-REFERENCE TO RELATED APPLICATIONS

This application claims the benefit of Korean Patent Application No. 10-2023-0091975, filed on Jul. 14, 2023, which application is hereby incorporated herein by reference.

TECHNICAL FIELD

The present disclosure relates to a binder composition.

BACKGROUND

A light emitting element includes a light emitting layer located between conductive electrodes, and the light emitting layer emits light using a voltage, a current, and the like provided from the conductive electrodes. Examples of such a light emitting element include an alternating current field light emitting element that emits light with an alternating current field applied to the conductive electrodes, an inorganic light emitting device using light emitted from an inorganic semiconductor such as a quantum dot, an organic light emitting element using light emitted from an organic compound, and the like.

In general, the light emitting layer included in the above-described light emitting element contains light emitting particles that emit light and a binder for fixing the light emitting particles. As such a binder, materials with excellent chemical resistance such as a vinyl-based polymer, cyanoethyl pullulan, and cyanated cellulose have been conventionally used. In the case of the alternating current field light emitting element, in particular, a material with high dielectric constant and high dielectric strength has been used to improve element luminance and lifetime.

In one example, the binder contained in the light emitting layer is required to have excellent heat resistance. When the heat resistance of the binder is poor, the binder may be decomposed in a high-temperature environment, and thus, the luminance and the lifetime of the light emitting element may be reduced. In addition, the binder contained in the light emitting layer is required to have excellent coating properties (e.g., wettability). This is because, in a process of forming the conventional light emitting layer in which a binder composition dispersed in a solvent and the light emitting particles are coated on a substrate (e.g., an electrode or the like), when the coating properties of the binder is poor, the light emitting particles are not able to be uniformly distributed on the substrate, which may cause a problem in which luminance uniformity of the light emitting element is deteriorated.

As described above, the binder contained in the light emitting layer is required to have the excellent heat resistance and the excellent coating properties, but conventionally, only studies to improve the chemical resistance or the dielectric constant of the binder have been conducted, and studies to improve the heat resistance and the coating properties have been insufficient.

SUMMARY

The present disclosure relates to a binder composition, an epoxy-based cured product formed therefrom, and a light emitting layer containing the epoxy-based cured product. An embodiment of the present disclosure can solve the above-mentioned problems occurring in the prior art while advantages achieved by the prior art are maintained intact.

An embodiment of the present disclosure can provide a binder having excellent heat resistance and excellent wettability.

The technical problems to be solved by an embodiment of the present disclosure are not necessarily limited to the aforementioned problems, and any other technical problems not mentioned herein can be clearly understood from the following description by those skilled in the art to which the present disclosure pertains.

According to an embodiment of the present disclosure, a binder composition includes a multifunctional compound containing three or more functional groups, a first bifunctional epoxy resin, and a second bifunctional epoxy resin having a weight average molecular weight greater than a weight average molecular weight of the first bifunctional epoxy resin, and a mass ratio of the first bifunctional epoxy resin and the second bifunctional epoxy resin is in a range from 0.45:1 to 7.0:1.

According to an embodiment of the present disclosure, an epoxy-based cured product includes an epoxy resin crosslinked product where a first bifunctional epoxy resin and a second bifunctional epoxy resin having a weight average molecular weight greater than a weight average molecular weight of the first bifunctional epoxy resin are connected to each other via crosslinking by a multifunctional compound containing three or more functional groups, and a mass ratio of the first bifunctional epoxy resin and the second bifunctional epoxy resin is in a range from 0.45:1 to 7.0:1.

According to an embodiment of the present disclosure, a light emitting layer includes an epoxy resin crosslinked product where a first bifunctional epoxy resin and a second bifunctional epoxy resin having a weight average molecular weight greater than a weight average molecular weight of the first bifunctional epoxy resin are connected to each other via crosslinking by a multifunctional compound containing three or more functional groups, and light emitting particles, and a mass ratio of the first bifunctional epoxy resin and the second bifunctional epoxy resin is in a range from 0.45:1 to 7.0:1.

BRIEF DESCRIPTION OF THE DRAWINGS

The above and other features and advantages of an embodiment of the present disclosure can be more apparent from the following detailed description taken in conjunction with the accompanying drawings.

DETAILED DESCRIPTION OF ILLUSTRATIVE EMBODIMENTS

Figure 1:
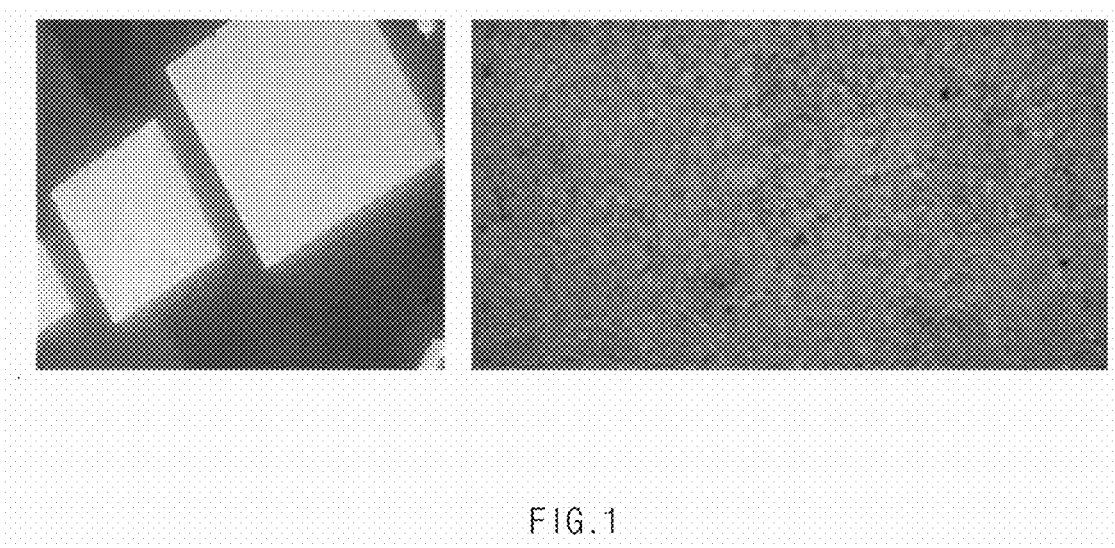
FIG. 1 shows an image of a light emitting element of a Present Example 5 of an embodiment of the present disclosure and an optical microscope image of a distribution of light emitting particles in a light emitting layer thereof.

Hereinafter, for embodiments of the present disclosure, a binder composition, an epoxy-based cured product formed therefrom, and a light emitting layer containing the epoxy-based cured product as a binder will be described in detail such that those skilled in the art to which the present disclosure pertains may easily implement the same.

Embodiment of Binder Composition and Epoxy-Based Cured Product

A binder composition according to an embodiment of the present disclosure contains a first bifunctional epoxy resin, a second bifunctional epoxy resin, and a multifunctional compound.

An epoxy-based cured product according an embodiment of to the present disclosure contains an epoxy resin crosslinked product in which the first bifunctional epoxy resin and the second bifunctional epoxy resin are connected to each other via crosslinking by the multifunctional compound.

In an embodiment, each of the first bifunctional epoxy resin and the second bifunctional epoxy resin may be bifunctional. In this regard, the epoxy resin being bifunctional can mean that the epoxy resin contains two functional groups (i.e., two epoxy groups).

In an embodiment, a second bifunctional epoxy resin may have a weight average molecular weight greater than that of the first bifunctional epoxy resin. In this case, the first bifunctional epoxy resin may also be referred to as a low molecular weight epoxy resin, and the second bifunctional epoxy resin may also be referred to as a high molecular weight epoxy resin.

In an embodiment, a multifunctional compound may be a crosslinking agent or a curing agent containing three or more functional groups. In this regard, the functional group of the multifunctional compound may have a crosslinking reaction with the epoxy group contained in at least one of the first bifunctional epoxy resin and the second bifunctional epoxy resin. For example, the functional group of the multifunctional compound may be a thiol group, an amine group, a hydroxyl group, or the like.

In an embodiment, the multifunctional compound may be a thiol-based compound. In this case, low-temperature curability and flexibility of the epoxy resin crosslinked product may be improved.

In an embodiment, the multifunctional compound may include at least one compound selected from a group consisting of trimethylolpropane tris(3-mercaptopropionate), pentaerythritol tetrakis(3-mercaptopropionate), dipentaerythritol hexakis(3-mercaptopropionate), tris-[(3-mercaptopropionyloxy)-ethyl]-isocyanurate, tris(3-mercapto-propyl) isocyanurate, octyl thioglycolate, ethylene glycol bisthioglycolate, trimethylolpropane tris(thioglycolate), pentaerythritol tetrakis(thioglycolate), 3-mercaptopropionic acid, pentaerythritol tetrakis(3-mercaptobutyrate), 1,4-bis (3-mercaptobutyryloxy) butane, 1,3,5-tris(3-mercaptobutyryloxyethyl)-1,3,5-triazine-2,4,6(1H,3H,5H)-trione, trimethylolpropane tris(3-mercaptobutylate), and trimethylolethane tris(3-mercaptobutyrate), or any combination thereof, and preferably, may be trifunctional trimethylolpropane tris(3-mercaptopropionate).

In an embodiment, an epoxy resin crosslinked product may be formed by a crosslinking (curing) reaction between the functional group of the multifunctional compound and the epoxy group the first bifunctional epoxy resin and/or the second bifunctional epoxy resin. In this regard, a mass ratio of the first bifunctional epoxy resin and the second bifunctional epoxy resin contained in the binder composition may be in a range from 0.45:1 to 7.0:1; or in a range from 0.5:1 to 6.3:1, preferably in a range from 0.5:1 to 5.33:1, for example. In an embodiment, when the mass ratio of the first bifunctional epoxy resin and the second bifunctional epoxy resin satisfies the above range, the epoxy resin crosslinked product may have both excellent heat resistance derived from the first bifunctional epoxy resin having the relatively small weight average molecular weight and excellent coating properties derived from the second bifunctional epoxy resin having the relatively great weight average molecular weight.

In an embodiment, a weight average molecular weight of the first bifunctional epoxy resin may be in a range from 200 to 700 g/mol, or from 300 to 500 g/mol, or preferably, from 350 to 400 g/mol. In this regard, when the weight average molecular weight of the first bifunctional epoxy resin satisfies an above range, the epoxy resin crosslinked product may have more excellent heat resistance.

In an embodiment, a weight average molecular weight of the second bifunctional epoxy resin may be in a range from 100,000 to 350,000 g/mol, from 150,000 to 300,000 g/mol, or from 200,000 to 280,000 g/mol, or preferably, from 250,000 to 270,000 g/mol. In this regard, when the weight average molecular weight of the second bifunctional epoxy resin satisfies an above range, the epoxy resin crosslinked product may have more excellent coating properties.

In an embodiment, each of the first bifunctional epoxy resin and the second bifunctional epoxy resin may independently contain the epoxy group at each of both distal ends of a polymer. In this case, structural stability of the epoxy resin crosslinked product may be improved, and crosslinking density adjustment of the epoxy resin crosslinked product may be facilitated.

In an embodiment, each of the first bifunctional epoxy resin and the second bifunctional epoxy resin may independently include a bisphenol-type epoxy resin, an aromatic amine-type epoxy resin, an alicyclic epoxy resin, or any combination thereof. For example, each of the first bifunctional epoxy resin and the second bifunctional epoxy resin may independently be a homopolymer such as the bisphenol-type epoxy resin, the aromatic amine-type epoxy resin, or the alicyclic epoxy resin, or a copolymer thereof, or a blend containing such resins.

Preferably, in an embodiment, the first bifunctional epoxy resin and/or the second bifunctional epoxy resin may be the homopolymer, and more preferably, both the first bifunctional epoxy resin and the second bifunctional epoxy resin may be the homopolymer. In this case, the first bifunctional epoxy resin and the second bifunctional epoxy resin may be derived from different types of monomers (e.g., the first bifunctional epoxy resin may be the bisphenol-type epoxy resin and the second bifunctional epoxy resin may be the aromatic amine-type epoxy resin). However, preferably in an embodiment, the first bifunctional epoxy resin and the second bifunctional epoxy resin may be derived from the same type of monomer, and most preferably in an embodiment, the first bifunctional epoxy resin and the second bifunctional epoxy resin may be a bisphenol A-type epoxy resin.

In an embodiment, a binder composition may further contain a cross-linking catalyst. As the cross-linking catalyst, various types of known catalysts (e.g., an amine-based compound, an imidazole-based compound, and the like) that are known to be used in epoxy polymerization may be used without limitation. However, preferably in an embodiment, a catalyst (e.g., 1-epoxy imidazole and the like) containing a nucleophilic nitrogen atom may be used.

Embodiment of Light Emitting Layer

A light emitting layer according to an embodiment of the present disclosure contains the above-mentioned epoxy resin crosslinked product and light emitting particles.

As described above, in the epoxy resin crosslinked product, the first bifunctional epoxy resin, and the second bifunctional epoxy resin are connected to each other via the crosslinking by the multifunctional compound. Hereinafter, redundant descriptions of the epoxy resin crosslinked product will be omitted. And hereinafter, redundant descriptions of the first bifunctional epoxy resin, the second bifunctional epoxy resin, and the multifunctional compound contained in the epoxy resin crosslinked product will be omitted.

The light emitting particles of an embodiment may be various types of particles known to emit light using an electrical signal such as a current and a voltage. The light emitting particles of an embodiment may be an organic compound or an inorganic compound, but preferably, may be the inorganic compound, and more preferably, may be quantum dots or quantum rods.

The quantum dots or the quantum rods can be inorganic light emitting particles that emit light as electrons in an unstable state descend from a conduction band to a valence band, and can have a single structure or a heterogeneous core-shell structure. The shell may be composed of one shell or may be composed of multiple shells.

The quantum dots or the quantum rods may be semiconductor nanocrystals or metal oxide particles. For example, the quantum dots or the quantum rods may include any combination of: a group II-VI, group I-III-VI, or group III-V nano-semiconductor compound. In detail, the quantum dots or the quantum rods may be group II to VI compound semiconductor nanocrystals such as CdS, CdSe, CdTe, ZnS, ZnSe, ZnTe, HgS, HgTe, or combinations thereof; group III to V or IV to VI compound semiconductor nanocrystals such as GaP, GaAs, GaSb, InP, InAs, and InSb; PbS, PbSe, PbTe, or any combination thereof; $AgGaS_2$, $AgGaSe_2$, $AgGaTe_2$, $CuInS_2$, $CuInSe_2$, $CuGaS_2$, or $CuGaSe$, nanocrystals; metal oxide nanoparticles such as ZnO, $TiO_2$, or combinations thereof; or nanocrystals of the core-shell structure such as CdSe/ZnSe, CdSe/ZnS, CdS/ZnSe, CdS/ZnS, ZnSe/ZnS, InP/ZnS ZnO/MgO, or any combination thereof, for example. The semiconductor nanoparticles may be doped with rare earth elements such as Eu, Er, Tb, Tm, Dy, or any combination thereof, or undoped, or may be doped with transition metal elements such as Mn, Cu, Ag, Al, or any combination thereof.

In an embodiment, the light emitting particles may be dispersed in a matrix of the epoxy resin crosslinked product. In this regard, the epoxy resin crosslinked product may serve to fix the light emitting particles.

In an embodiment, a mass ratio of the light emitting layer and the light emitting particles may be in a range from 0.4 to 0.89, from 0.45 to 0.89, or from 0.5 to 0.89. When the mass ratio satisfies an above range, luminance, lifespan, and coating properties of the light emitting layer may be improved.

Embodiment of Light Emitting Element and Method Embodiment for Manufacturing the Same In an embodiment, a light emitting element may include the above-described light emitting layer, and conductive electrodes.

The light emitting layer may be disposed between the conductive electrodes. Accordingly, the light emitting layer may emit light using a voltage, a current, and the like provided from the conductive electrodes.

Optionally, in an embodiment, the light emitting element may further include a functional layer located between the light emitting layer and the conductive electrodes. The functional layer can improve the luminance and/or the lifespan of the light emitting element, and can be various types of known functional layers. For example, the functional layer may be a dielectric layer for improving the luminance of the light emitting element.

In a method embodiment for manufacturing a light emitting element, the method may include forming the light emitting layer on at least one surface of the conductive electrodes. In this regard, the forming of the light emitting layer may include coating a solvent in which the light emitting particles and the above-described binder composition of an embodiment of the present disclosure are dispersed on the surface of the conductive electrodes.

In an embodiment, a type of the solvent is not particularly limited. However in an embodiment, preferably, the solvent may have a higher vapor pressure than water at a room temperature. When the vapor pressure of the solvent is higher than that of water, volatilization of the solvent may be suppressed during the process of manufacturing the light emitting element, and accordingly, viscosity adjustment of the binder composition and the light emitting particles dispersed in the solvent may become easy, thereby improving process efficiency.

Optionally in an embodiment, when the light emitting element further includes the functional layer, a method embodiment for manufacturing the light emitting element may include forming the light emitting layer on at least one surface of the functional layer, or forming the light emitting layer and the functional layer on the at least one surface of the conductive electrodes.

Hereinafter, embodiments of the present disclosure will be described in more detail with Present Examples. However, such Present Examples are only for helping understanding of the present disclosure, and the scope of the present disclosure is not necessarily limited to such Present Examples in any sense.

Present Example 1: Film Manufacture Using Binder Composition

Present Example 1 includes 533 g of YD128 (manufactured by Kukdo Chemical Co., Ltd., bisphenol A-type epoxy resin with a molecular weight of 370) as the first bifunctional epoxy resin, and 100 g of Tarbender (manufactured by Smooth-On Co., Ltd., epoxy resin having a molecular weight of 265,000) as the second bifunctional epoxy resin, added and then mixed with each other at a speed of 2000 rpm for 5 minutes using a paste mixer (manufactured by Thinky Co.).

Thereafter for Present Example 1, 443 g of trimethylolpropane tris(3-mercaptopropionate) (TMPMP) was further added as the multifunctional compound (the curing agent) and mixed at a speed of 2000 rpm for 5 minutes using the paste mixer (manufactured by Thinky Co.), and then 8.23 g of 1-epoxy imidazole, the imidazole-based compound, was further added as the linking catalyst and mixed at a speed of 3000 rpm for 1 minute using a vortex mixer (manufactured by Scientific Industries) to prepare a mixed solution.

The mixed solution of Present Example 1 was spin-coated on a glass substrate at a speed of 2300 rpm for 15 seconds to form a thin film. The thin film was pre-heated at 60° C. for 1 hour to remove air bubbles therein, and then cured at 110° C. for 1 hour. And, a film was prepared by peeling the cured thin film from the glass substrate.

Present Examples 2 to 4: Film Manufacture Using Binder Composition

For Present Examples 2 to 4, films were manufactured in the same manner as in Present Example 1, except that contents of the first bifunctional epoxy resin, the multifunctional compound (the curing agent), and the cross-linking catalyst were as shown in Table 1 below.

Comparative Examples 1 and 2: Film Manufacture Using Binder Composition

For Present Example 2, films were manufactured in the same manner as in Present Example 1, except that contents of the first bifunctional epoxy resin, the multifunctional compound (the curing agent), and the cross-linking catalyst were as shown in Table 1 below.

Comparative Example 3: PVB Film Manufacture Using PVA

For Present Example 3, 150 g of n-butanal was added as the curing agent to PVA (polyvinyl alcohol) and mixed at a speed of 2000 rpm for 5 minutes using the paste mixer (manufactured by Thinky Co.), and then 1.3 g of HCl was further added as a catalyst and mixed at a speed of 3000 rpm for 1 minute using the vortex mixer (manufactured by Scientific Industries) to prepare a PVB mixed solution.

For Present Example 3, the mixed solution was spin-coated on the glass substrate at a speed of 2300 rpm for 15 seconds to form a thin film. The thin film was pre-heated at 60° C. for 1 hour to remove air bubbles therein and then cured for 1 hour at 110° C. And, a film was manufactured by peeling the cured thin film from the glass substrate.

TABLE 2

| | Film manufacture availability | Heat resistance (° C.) | Transmittance after being left at high temperature (%) |
|---|---|---|---|
| Present Example 1 | O | 307.4 | 99.9 |
| Present Example 2 | O | 303.1 | 99.3 |
| Present Example 3 | O | 295.2 | 98.2 |
| Present Example 4 | O | 280.1 | 97.5 |
| Comparative Example 1 | X | — | — |
| Comparative Example 2 | O | 268.4 | 92.33 |
| Comparative Example 3 | O | 256.9 | 91.72 |

Referring to Table 2, the films of Present Examples 1 to 4 exhibited excellent heat resistance and had excellent transmittance even after being left at the high temperature.

On the other hand, when the content of the first bifunctional epoxy resin is excessively great (Comparative Example 1), it was practically impossible to manufacture the film because of poor binder properties, making it practically impossible to evaluate the heat resistance and the film transmittance. The film of Comparative Example 3 exhibited poor heat resistance and poor transmittance after being left at the high temperature.

On the other hand, the film of Comparative Example 2 showed excellent heat resistance and excellent transmittance

TABLE 1

| | Composition (g) | | | | | | |
|---|---|---|---|---|---|---|---|
| | | | | Curing agent | | Catalyst | |
| | First bifunctional epoxy resin | Second bifunctional epoxy resin | PVA | Multifunctional compound | N-butanal | Cross-linking catalyst | HCl |
| Present Example 1 | 533 | 100 | 0 | 443 | 0 | 8.23 | 0 |
| Present Example 2 | 350 | 100 | 0 | 315 | 0 | 5.85 | 0 |
| Present Example 3 | 200 | 100 | 0 | 210 | 0 | 3.90 | 0 |
| Present Example 4 | 50.0 | 100 | 0 | 105 | 0 | 1.95 | 0 |
| Comparative Example 1 | 1000 | 100 | 0 | 770 | 0 | 14.3 | 0 |
| Comparative Example 2 | 40.0 | 100 | 0 | 98.0 | 0 | 1.82 | 0 |
| Comparative Example 3 | 0 | 0 | 150 | 0 | 150 | 0 | 1.30 |

Experimental Example 1: Evaluation of Films of Present Examples 1 to 4, and Comparative Examples 1 to 3

Heat resistance and transmittance after being left at a high temperature of the films of Present Examples 1 to 4 and Comparative Examples 1 to 3 were evaluated, and results thereof are shown in Table 2 below. The heat resistance was evaluated by a temperature measured when a 5% weight change of a 10 mg film occurred in an air atmosphere using thermogravimetric analysis (TGA).

The transmittance after being left at the high temperature was evaluated by ASTM D 1003 standard for transmittance at a wavelength of 550 nm after leaving a 50 mm×50 mm film in a constant temperature bath at 110° C. for 300 hours.

after being left at the high temperature compared to the film of Comparative Example 3, but levels thereof were generally similar to each other.

Present Example 5: Manufacture of Light Emitting Element Including Light Emitting Layer Using Binder Composition and Light Emitting Particles In Present Example 5, a total 115.1 g (mass of first bifunctional epoxy resin: mass of second bifunctional epoxy resin=5.33:1) of The YD128 (manufactured by Kukdo Chemical Co., the bisphenol A-type epoxy resin with the molecular weight of 370) as the first bifunctional epoxy resin and the Tarbender (manufactured by Smooth-On Co., Ltd., the epoxy resin with the molecular weight of 265,000) as the second bifunctional epoxy resin, and 782.8 g of ZnS:

Cu, Cl (manufactured by LWB) as the light emitting particles, were added and mixed with each other at a speed of 2000 rpm for 5 minutes using the paste mixer (manufactured by Thinky).

Thereafter in Present Example 5, 80.6 g of the TMPMP was further added as the multifunctional compound (the curing agent) and mixed at a speed of 2000 rpm for 5 minutes using the paste mixer (manufactured by Thinky), and 1.5 g of the 1-epoxy imidazole, the imidazole-based compound, as the cross-linking catalyst was further added and mixed at a speed of 3000 rpm for 1 minute using the vortex mixer (manufactured by Scientific Industries) to prepare a mixed solution.

The mixed solution of Present Example 5 was screen-printed (using JSP-SA180 manufactured by J-ONE CO., LTD) on a transparent electrode (ITO) and then sufficiently dried to manufacture a light emitting element including a light emitting layer.

Present Examples 6 to 8: Manufacture of Light Emitting Element Including Light Emitting Layer Using Binder Composition and Light Emitting Particles In Present Examples 6 to 8, a light emitting element including a light emitting layer was manufactured in the same manner as in Present Example 5, except that the mass ratio of the first bifunctional epoxy resin and the second bifunctional epoxy resin was as shown in Table 3 below.

Present Examples 9 and 10: Manufacture of Light Emitting Element Including Light Emitting Layer Using Binder Composition and Light Emitting Particles In Present Examples 9 and 10, a light emitting element including a light emitting layer was manufactured in the same manner as in Present Example 5, except that the contents of the first bifunctional epoxy resin, the second bifunctional epoxy resin, the multifunctional compound, and the cross-linking catalyst are as shown in Table 3 below.

Present Examples 11 and 12: Manufacture of Light Emitting Element Including Light Emitting Layer Using Binder Composition and Light Emitting Particles In Present Examples 11 to 12, a light emitting element including a light emitting layer was manufactured in the same manner as in Present Example 5, except that the solvent content was as shown in Table 3 below.

Comparative Example 4: Manufacture of Light Emitting Element Including Light Emitting Layer Using Binder Composition and Light Emitting Particles In Comparative Example 4, a light emitting element including a light emitting layer was manufactured in the same manner as in Present Example 5, except that the content ratio of the first bifunctional epoxy resin and the second bifunctional epoxy resin was as shown in Table 3 below.

Comparative Example 5: Manufacture of Light Emitting Element Including Light Emitting Layer Using PVA and Light Emitting Particles In Comparative Example 5, 115.1 g of PVA, and 782.8 g of ZnS: Cu, Cl (manufactured by LWB) as the light emitting particles, were added to 20 g of a DBE (manufactured by DAEJUNG) solvent, and then mixed with each other at a speed of 2000 rpm for 5 minutes using the paste mixer (manufactured by Thinky).

Thereafter for Comparative Example 5, 80.6 g of the n-butanal was further added as the curing agent and mixed at a speed of 2000 rpm for 5 minutes using the paste mixer (manufactured by Thinky Co.), and 1.5 g of HCl was further added as the catalyst and mixed at a speed of 3000 rpm for 1 minute using the vortex mixer (manufactured by Scientific Industries Co.), to prepare a mixed solution of the PVB and the light emitting particles.

In Comparative Example 5, the mixed solution was screen-printed (using JSP-SA180 manufactured by J-ONE CO., LTD) on the transparent electrode (ITO) and then sufficiently dried to prepare a light emitting layer.

Comparative Examples 6 and 7: Manufacture of Light Emitting Element Including Light Emitting Layer Using PVA and Light Emitting Particles In Comparative Examples 6 and 7, a light emitting element including a light emitting layer was manufactured in the same manner as in Comparative Example 5, except that the solvent content was as shown in Table 3 below.

TABLE 3

| | Composition (g) | | | | | | | | |
| | First bifunctional epoxy resin (A) and second bifunctional epoxy resin (B) | | | Curing agent | | Catalyst Cross- | | Light emit- | |
| | Total mass | Mass ratio (A:B) | PVA | Multi-functional compound | N-butanal | linking cat-alyst | HCl | ting par-ticles | Sol-vent |
|---|---|---|---|---|---|---|---|---|---|
| Present Example 5 | 115.1 | 5.33:1 | 0 | 80.6 | 0 | 1.5 | 0 | 782.8 | 20 |

11                                                                                                                                    12

TABLE 3-continued

| | Composition (g) | | | | | | | | |
|---|---|---|---|---|---|---|---|---|---|
| | First bifunctional epoxy resin (A) and second bifunctional epoxy resin (B) | | | Curing agent | | Catalyst | | Light emit- | |
| | Total mass | Mass ratio (A:B) | PVA | Multi-functional compound | N-butanal | Cross-linking cat-alyst | HCl | ting par-ticles | Sol-vent |
| Present Example 6 | 115.1 | 3.5:1 | 0 | 80.6 | 0 | 1.5 | 0 | 782.8 | 20 |
| Present Example 7 | 115.1 | 2.0:1 | 0 | 80.6 | 0 | 1.5 | 0 | 782.8 | 20 |
| Present Example 8 | 115.1 | 0.5:1 | 0 | 80.6 | 0 | 1.5 | 0 | 782.8 | 20 |
| Present Example 9 | 68.6 | 5.33:1 | 0 | 48.1 | 0 | 0.90 | 0 | 862.4 | 20 |
| Present Example 10 | 286.0 | 5.33:1 | 0 | 200.3 | 0 | 3.7 | 0 | 490.0 | 20 |
| Present Example 11 | 115.1 | 5.33:1 | 0 | 80.6 | 0 | 1.5 | 0 | 782.8 | 15 |
| Present Example 12 | 115.1 | 5.33:1 | 0 | 80.6 | 0 | 1.5 | 0 | 782.8 | 25 |
| Com-parative Example 4 | 115.1 | 0.4:1 | 0 | 80..6 | 0 | 1.5. | 0 | 782.8 | 20 |
| Com-parative Example 5 | 0 | — | 115.1 | 0 | 80.6 | 0 | 1.5 | 782.8 | 20 |
| Com-parative Example 6 | 0 | — | 115.1 | 0 | 80.6 | 0 | 1.5 | 782.8 | 10 |
| Com-parative Example 7 | 0 | — | 115.1 | 0 | 80.6 | 0 | 1.5 | 782.8 | 30 |

Experimental Example 2: Evaluation of Light Emitting Elements of Present Examples 5 to 12 and Comparative Examples 4 to 7

In the light emitting elements of Present Examples 5 to 12 and Comparative Examples 4 to 7, coating properties of the light emitting layer and a luminance reduction rate after being left at a high temperature were measured and shown in Table 4 below.

As for the coating properties of the light emitting layer, the mixed solution of embodiments was screen-printed (using JSP-SA180 manufactured by J-ONE CO., LTD) three times in one area on the transparent electrode (ITO) to manufacture the light emitting element, and then uniformity of luminance thereof was evaluated with the naked eye and an optical microscope image in a state in which the light emitting element is operated. It was evaluated to be O when the luminance uniformity is excellent as a luminance devia-tion is equal to or smaller than 20%, and to be X when the luminance appeared to be non-uniform as the luminance deviation exceeds 20%.

As for the luminance reduction rate after being left at the high temperature, the luminance of the light emitting ele-ment was measured, then luminance after leaving the light emitting element in a thermostat at 110° C. for 300 hours was measured once more, and then a difference between the luminance before being left and the luminance after being left was evaluated as a ratio relative to the luminance before being left. In this regard, as for the luminance measurement, luminance of 9 points within the light emitting element were measured based on the standard KS-C 7613, and an average value thereof was used as the luminance.

TABLE 4

| | Coating properties | Luminance reduction rate (%) |
|---|---|---|
| Present Example 5 | O | 10.41 |
| Present Example 6 | O | 10.79 |
| Present Example 7 | O | 11.19 |
| Present Example 8 | O | 11.89 |
| Present Example 9 | O | 10.86 |
| Present Example 10 | O | 10.71 |
| Present Example 11 | O | 10.41 |
| Present Example 12 | O | 10.41 |
| Comparative Example 4 | O | 18.59 |
| Comparative Example 5 | O | 21.42 |
| Comparative Example 6 | X | — |
| Comparative Example 7 | X | — |

Referring to Table 4, the light emitting elements of Present Example 5 to Present Example 12 and the light emitting elements of Comparative Example 4 and Compara-tive Example 5 exhibited superior coating properties com-pared to the light emitting elements of Comparative Examples 6 and 7. For example, referring to FIG. 1, in the light emitting element of Present Example 5, the light emitting particles were evenly distributed in the light emit-ting layer, and thus, luminance non-uniformity did not appear when the light emitting element was driven.

Figure 2:
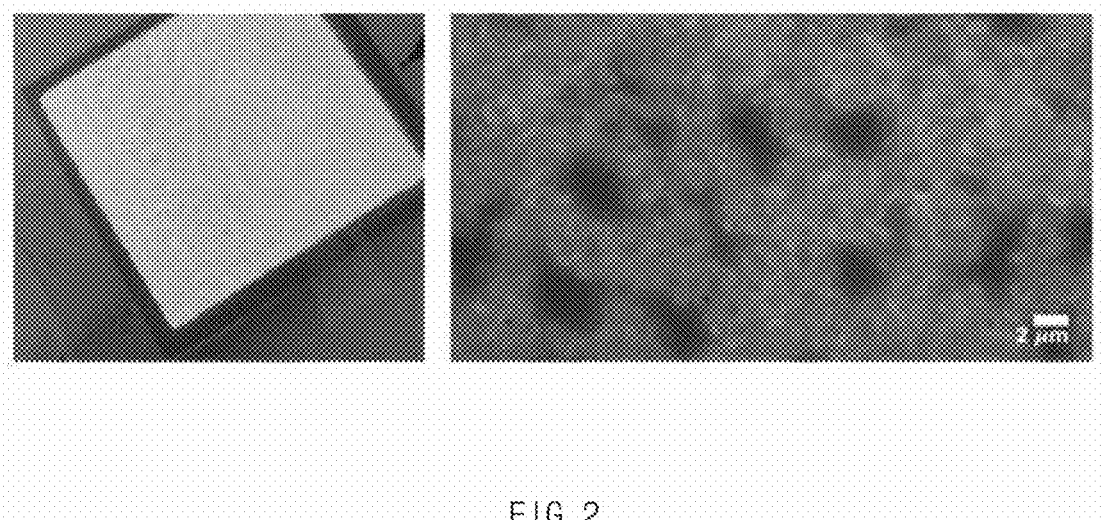
FIG. 2 shows an image of a light emitting element of Comparative Example 7 of an embodiment of the present disclosure and an optical microscope image of a distribution of light emitting particles in a light emitting layer thereof.

On the other hand, in Comparative Example 6 and Comparative Example 7, which differ only in an amount of the solvent during the manufacturing process from Comparative Example 5, when the amount of the solvent was smaller (Comparative Example 6), viscosity of the mixed solution was too great and spreadability was insufficient, resulting in non-uniformity of a coating surface of the mixed solution, and when the amount of the solvent was greater (Comparative Example 7), the viscosity of the mixed solution was too small and the spread occurred excessively, resulting in the luminance non-uniformity (see FIG. 2) during the operation of the light emitting element as the light emitting particles migrate along the solvent and stick together during drying of the mixed solution. That is, it may be seen that, in cases of using the PVB as the binder for the light emitting layer (Comparative Examples 5 to 7), when the amount of the solvent in the manufacturing process is too small (Comparative Example 6) or too great (Comparative Example 7), the coating properties were poor.

On the other hand, in cases of Present Examples 5, 11, and 12 in which the first bifunctional epoxy resin and the second bifunctional epoxy resin are used as the binder of the light emitting layer, even when the amount of the solvent in the manufacturing process was relatively small (Present Example 11) or relatively great (Present Example 12), the coating properties were excellent.

In addition, the light emitting elements of Present Examples 5 to 12 exhibited a relatively low luminance reduction rate and had excellent heat resistance, whereas the light emitting element of Comparative Example 5 exhibited a high luminance reduction rate and had poor heat resistance. In addition, the light emitting element of Comparative Example 4 exhibited a lower luminance reduction rate than the light emitting element of Comparative Example 5, but levels thereof were generally similar to each other.

An epoxy-based cured product formed using the binder composition according to an embodiment of the present disclosure includes the epoxy resin crosslinked product. The epoxy resin crosslinked product of an embodiment may have both the excellent heat resistance derived from the first bifunctional epoxy resin having the relatively small weight average molecular weight and the excellent coating properties derived from the second bifunctional epoxy resin having the relatively great weight average molecular weight. Therefore, when the epoxy-based cured product of an embodiment is used as the binder of the light emitting layer, the luminance and the lifespan of the light emitting element may be increased and the reliability thereof may be improved.

Hereinabove, although the present disclosure has been described with reference to exemplary embodiments and the accompanying drawings, embodiments of the present disclosure are not necessarily limited thereto, but may be variously modified and altered by those skilled in the art to which the present disclosure pertains without departing from the spirit and scope of the present disclosure claimed in the following claims.

What is claimed is:

1. A binder composition comprising:
a multifunctional compound containing three or more functional groups;
a first bifunctional epoxy resin; and
a second bifunctional epoxy resin having a weight average molecular weight greater than a weight average molecular weight of the first bifunctional epoxy resin, wherein a mass ratio of the first bifunctional epoxy resin and the second bifunctional epoxy resin is in a range from 0.45:1 to 7.0:1.

2. The composition of claim 1, wherein the weight average molecular weight of the first bifunctional epoxy resin is in a range from 200 to 700 g/mol.

3. The composition of claim 1, wherein the weight average molecular weight of the second bifunctional epoxy resin is in a range from 100,000 to 350,000 g/mol.

4. The composition of claim 1, wherein each of the first bifunctional epoxy resin and the second bifunctional epoxy resin independently comprises an epoxy group at each of both distal ends of a polymer.

5. The composition of claim 1, wherein each of the first bifunctional epoxy resin and the second bifunctional epoxy resin independently comprises at least one selected from a group consisting of a bisphenol-type epoxy resin, an aromatic amine-type epoxy resin, and an alicyclic epoxy resin.

6. The composition of claim 5, wherein one or both of the first bifunctional epoxy resin and the second bifunctional epoxy resin is a homopolymer.

7. The composition of claim 1, wherein the functional group of the multifunctional compound is crosslinked with an epoxy group contained in one or both of the first bifunctional epoxy resin and the second bifunctional epoxy resin, to form an epoxy resin crosslinked product.

8. The composition of claim 1, wherein the multifunctional compound is a thiol-based compound.

9. The composition of claim 8, wherein the multifunctional compound comprises at least one compound selected from a group consisting of trimethylolpropane tris(3-mercaptopropionate), pentaerythritol tetrakis(3-mercaptopropionate), dipentaerythritol hexakis(3-mercaptopropionate), tris-[(3-mercaptopropionyloxy)-ethyl]-isocyanurate, tris(3-mercaptopropyl) isocyanurate, octyl thioglycolate, ethylene glycol bisthioglycolate, trimethylolpropane tris(thioglycolate), pentaerythritol tetrakis(thioglycolate), 3-mercaptopropionic acid, pentaerythritol tetrakis(3-mercaptobutyrate), 1,4-bis(3-mercaptobutyryloxy) butane, 1,3,5-tris(3-mercaptobutyryloxyethyl)-1,3,5-triazine-2,4,6(1H,3H,5H)-trione, trimethylolpropane tris(3-mercaptobutylate), and trimethylolethane tris(3-mercaptobutyrate).

10. The composition of claim 1, further comprising a cross-linking catalyst.

11. The composition of claim 10, wherein the cross-linking catalyst comprises an amine-based compound or an imidazole-based compound.

12. An epoxy-based cured product comprising:
an epoxy resin crosslinked product comprising a first bifunctional epoxy resin and a second bifunctional epoxy resin, the second bifunctional epoxy resin having a weight average molecular weight greater than a weight average molecular weight of the first bifunctional epoxy resin,
wherein the first bifunctional epoxy resin and the second bifunctional epoxy resin are connected to each other via crosslinking by a multifunctional compound containing three or more functional groups, and
wherein a mass ratio of the first bifunctional epoxy resin and the second bifunctional epoxy resin is in a range from 0.45:1 to 7.0:1.

13. The product of claim 12, wherein the crosslinking is formed by a crosslinking reaction between an epoxy group included in one of or any combination of the first bifunctional epoxy resin, the second bifunctional epoxy resin, and the functional group contained in the multifunctional compound.

14. The product of claim 12, wherein each of the first bifunctional epoxy resin and the second bifunctional epoxy resin independently comprises an epoxy group at each of both distal ends of a polymer.

15. The product of claim 12, wherein the multifunctional compound is a thiol-based compound.

16. A light emitting layer comprising:

an epoxy resin crosslinked product comprising a first bifunctional epoxy resin and a second bifunctional epoxy resin, the second bifunctional epoxy resin having a weight average molecular weight greater than a weight average molecular weight of the first bifunctional epoxy resin, wherein the first bifunctional epoxy resin and the second bifunctional epoxy resin are connected to each other via crosslinking by a multifunctional compound containing three or more functional groups; and light emitting particles, wherein a mass ratio of the first bifunctional epoxy resin and the second bifunctional epoxy resin is in a range from 0.45:1 to 7.0:1.

17. The layer of claim 16, wherein the light emitting particles are dispersed in a matrix of the epoxy resin crosslinked product.

18. The layer of claim 16, wherein the crosslinking is formed by a crosslinking reaction between an epoxy group included in one of or any combination of the first bifunctional epoxy resin, the second bifunctional epoxy resin, and the functional group contained in the multifunctional compound.

19. The layer of claim 16, wherein each of the first bifunctional epoxy resin and the second bifunctional epoxy resin independently comprises an epoxy group at each of both distal ends of a polymer.

20. The layer of claim 16, wherein the multifunctional compound is a thiol-based compound.

* * * * *